(12) United States Patent
Salli

(10) Patent No.: US 7,831,681 B1
(45) Date of Patent: Nov. 9, 2010

(54) FLEXIBLY PROVISIONING AND ACCESSING STORAGE RESOURCES USING VIRTUAL WORLDWIDE NAMES

(75) Inventor: Tommi T. Salli, Mountain View, CA (US)

(73) Assignee: Symantec Operating Corporation, Mountain View, CA (US)

( * ) Notice: Subject to any disclaimer, the term of this patent is extended or adjusted under 35 U.S.C. 154(b) by 567 days.

(21) Appl. No.: 11/541,007

(22) Filed: Sep. 29, 2006

(51) Int. Cl.
G06F 15/167 (2006.01)

(52) U.S. Cl. ............... 709/212; 370/254; 370/398; 709/220; 709/226; 709/245; 711/1; 711/152; 711/202; 714/25; 719/328

(58) Field of Classification Search ........... 709/212
See application file for complete search history.

(56) References Cited

U.S. PATENT DOCUMENTS

| | | | |
|---|---|---|---|
| 6,393,483 B1 | 5/2002 | Latif et al. | 709/226 |
| 7,051,167 B2 * | 5/2006 | Ito et al. | 711/152 |
| 7,093,265 B1 * | 8/2006 | Jantz et al. | 719/321 |
| 7,293,152 B1 * | 11/2007 | Srinivasan et al. | 711/202 |
| 7,401,338 B1 * | 7/2008 | Bowen et al. | 719/328 |
| 2002/0194294 A1 | 12/2002 | Blumenau et al. | 709/213 |
| 2003/0005350 A1 | 1/2003 | Koning et al. | 714/4 |
| 2003/0188233 A1 | 10/2003 | Lubbers et al. | 714/100 |
| 2003/0212785 A1 | 11/2003 | Jibbe | 709/224 |
| 2004/0151188 A1 * | 8/2004 | Maveli et al. | 370/398 |
| 2005/0010688 A1 * | 1/2005 | Murakami et al. | 709/245 |
| 2005/0050392 A1 * | 3/2005 | Baba et al. | 714/25 |
| 2005/0080982 A1 * | 4/2005 | Vasilevsky et al. | 711/1 |
| 2005/0281191 A1 | 12/2005 | McGee et al. | 370/216 |
| 2006/0227702 A1 | 10/2006 | Ash et al. | 370/216 |
| 2007/0094378 A1 * | 4/2007 | Baldwin et al. | 709/223 |
| 2007/0130295 A1 * | 6/2007 | Rastogi et al. | 709/220 |
| 2008/0028107 A1 | 1/2008 | Cherian et al. | 710/9 |
| 2008/0104243 A1 * | 5/2008 | Roscoe et al. | 709/226 |

OTHER PUBLICATIONS

"dpANS SCSI Primary Commands—3 (SPC-3), Revision 23, Sec. 5.6—Reservations," Downloaded on Mar. 8, 2007 from: http://t10.org/ftp/t10/drafts/spc3/spc3r23.pdf, May 4, 2005, pp. 62-83.
"dpANS SCSI Architecture Model—3 (SAM-3), Revision 14." Downloaded on Mar. 17, 2007 from: http//t10.org/ftp/t10/drafts/sam3/sam3r14.pdf, Sep. 21, 2004, pp. i-xiii and 1-114.

(Continued)

Primary Examiner—Firmin Backer
Assistant Examiner—Tobias J Casaw
(74) Attorney, Agent, or Firm—Campbell Stephenson LLP

(57) ABSTRACT

A method, apparatus, system and computer program product that provide a virtual worldwide name (vWWN) nameservice in a Fiber Channel storage area network (SAN) are provided. Embodiments of the vWWN nameservice can receive a request for a vWWN from a node in the SAN, where the request includes a identifier associated with resources in the SAN, then determine if the identifier matches contents of a field in one or more entries in a vWWN table or database, and provide the vWWN associated with a matching entry to the requesting node.

15 Claims, 6 Drawing Sheets

Initiator Node

(410) Determine that Node requires access to FC resources GRP1

(415) Query vWWN Nameservice for GRP1 using an identifier for GRP1 vWWN Nameservice

(420) (a) Determine if vWWN Nameservice table has a matching entry for GRP1 identifier (425) (b) Determine availability of vWWN in matching entry (430) (c) Determine if Node has access rights to vWWN in matching entry (435) If (a)+(b)+(c), then grant vWWN to Node and store indication that vWWN is unavailable and assigned to Node (440) Create virtual N_Port with vWWN as associated identifier (445) Register vWWN and virtual N_Port with Fabric Directory Service (450) Perform PLOGI with all elements of GRP1

(455) Node and GRP1 resources communicate via vWWN virtual port

OTHER PUBLICATIONS

Frederick Wong, "Introducing NPort Identifier Visualization for IBM System z9," Downloaded on Mar. 8, 2007 from http://www.redbooks.ibm.com/redpapers/pdfs/redp4125.pdf, Apr. 6, 2006, pp. 1-26.

"Fibre Channel Framing and Signaling-2 (FC-FS-2), INCITS working draft proposed, Project T11/1619-D Rev 1.01, Chapter 4: Structure and Concepts," Downloaded on Mar. 8, 2007 from http://www.t11.org/ftp/t11/pub/fc/fs-2/06-085v3.pdf, Aug. 8, 2006, pp. 18-34.

Deepak K. Tawri, Abhay K. Singh, Raghu Krishnamurthy; "Port Identifier Management for Path Failover in Cluster Environments;" U.S. Appl. No. 11/731,854, filed Mar. 30, 2007; consisting of Specification, Claims and Abstract (26 pages); and Drawings (7 pages).

* cited by examiner

FLEXIBLY PROVISIONING AND ACCESSING STORAGE RESOURCES USING VIRTUAL WORLDWIDE NAMES

FIELD OF THE INVENTION

The present invention relates to storage area networks, and particularly to a system and method for providing a nameservice for allocating and distributing virtual worldwide names among Fibre Channel virtual end ports.

BACKGROUND OF THE INVENTION

The ever-increasing reliance on information and the computing systems that produce, process, distribute, and maintain such information in its various forms continues to put great demands on techniques for providing data storage and access to that data storage. As demands and expectations from an information network change over the lifetime of the information network, initial decisions made with regard to where and how data is stored in the information network may need to be altered, as well as determining which processing nodes can have access to that data storage. Modifying those initial decisions of storage allocation and access implicates not only a change in the storage resources themselves, but also allocation of network administrator resources to manually implement such changes.

For example, in large-scale storage area network (SAN)-based data centers, storage access and connectivity are typically provisioned in advance. Storage access flexibility is then balanced against storage access security. For example, in clusters of processor nodes accessing the SAN, all nodes are required to be configured to see all the storage resources they may ever need to use, even if a particular node is not using that storage at a particular moment. Further, each storage resource needs to be provisioned to and configured individually on all nodes in the cluster. Provisioning and configuration of all the storage resources and processor nodes can be error prone and makes adding additional processor nodes and storage resources to a cluster difficult.

Fast and flexible migration of storage resources from one node to another is administratively difficult without going through detailed planning and configurations prior to such migration. As an example, in a situation where a node suffers a physical host bus adapter (HBA) failure and that HBA requires replacement, each configuration related to that node has to be revised to ensure that storage connectivity is maintained. In a large storage area network having many processor nodes accessing many storage resources, the scale of this process is magnified.

It is therefore desirable to have a fast and flexible system for ensuring the availability of storage resources to processing nodes requiring access to those resources. It is further desirable that such a system have a low impact on network administration resources, while at the same time maintaining security of those resources. Further, it is desired that such a solution complement, rather than replace, currently implemented mechanisms for providing storage access and security in a storage area network.

SUMMARY OF THE INVENTION

Embodiments of the present invention present a method, apparatus, system and computer program product that provide a virtual worldwide name (vWWN) nameservice in a Fibre Channel storage area network (SAN). In one embodiment, this is accomplished by receiving request for a vWWN from a node in the SAN, where the request includes a identifier associated with resources in the SAN. The vWWN nameservice then determines if the identifier matches contents of a field in one or more entries in a vWWN table or database, and provides the vWWN associated with a matching entry to the requesting node.

In one aspect of the above embodiment, the identifier relates to characteristics associated with resources in the SAN. These characteristics can include a disk group identifier, a disk volume identifier and an application identifier.

In another aspect of the above embodiment, the vWWN nameservice determines for matching entries if the vWWN has already been assigned to another node, and if the vWWN is available, then providing the vWWN to the requesting node. In a further aspect of the above embodiment, the vWWN nameservice determines for matching entries whether the requesting node is permitted to access the matching vWWN, and if so, then provides the vWWN to the requesting node. In another aspect of the above, embodiment, the vWWN nameservice stores availability information in the entries of the vWWN table or database when the vWWN is provided to the requesting node.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

The present is implemented in a storage area network (SAN) in which processing and storage resources communicate utilizing a Fibre Channel network. Embodiments of the present invention use N_Port ID virtualization (NPIV), which is part of the T11 Fibre Channel standard, to dynamically configure a node's host bus adapter (HBA) to map specific storage resources to a virtual worldwide name (vWWN). Specifically, a nameservice mechanism for maintaining, querying, and supplying a mapping of vWWNs to storage resource identifiers is provided. The vWWN nameservice can also designate those processing nodes that are permitted to access particular storage resources through a vWWN and can track an identity of a node granted access to resources through a particular vWWN. In addition, the vWWN nameservice can ensure that each virtual worldwide name is unique for a particular storage area network.

One embodiment of the vWWN nameservice system can flexibly associate storage resources for particular applications by grouping those resources under a unique virtual world wide name. Such a system can also permit flexible allocation of the storage resource grouping to any processing node that requires access to those resources at a particular time.

Fibre Channel Terminology

Fibre Channel is a connection-oriented protocol requiring nodes to establish a channel via a login before communicating. Communication is established between logical elements, otherwise known as ports, existing within physical devices. A port can be one of several types depending on the type of the physical device and the connection topology for the Fibre Channel network.

Figure 1:
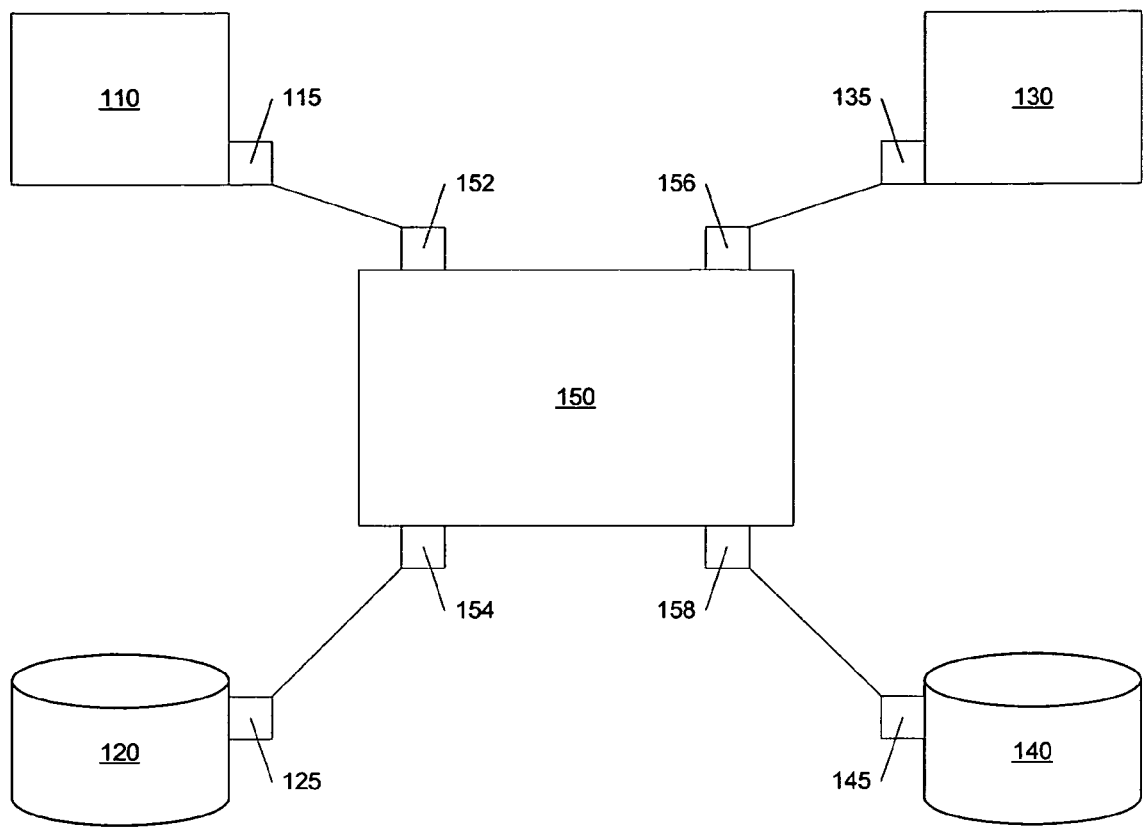
FIG. 1 is a simplified block diagram of a switched-fabric topology Fibre Channel network of a type compatible with embodiments of the present invention.

FIG. 1 is a simplified block diagram of a simple switched-fabric topology Fibre Channel network compatible with embodiments of the present invention. Fibre Channel nodes 110, 120, 130 and 140 are coupled via a switch fabric 150. Each node 110, 120, 130 and 140 communicates to the Fibre Channel network using a node port (115, 125, 135 and 145, respectively), also known as an N_Port. Each N_Port is coupled to the switch fabric via a fabric port, or F_Port, in the switch fabric (e.g., 152, 154, 156 and 158).

It should be noted that although FIG. 1 illustrates only one N_Port per node, each physical device can support multiple N_Ports and a switch fabric 150 can be configured with more than the four illustrated F_Ports. Further, while FIG. 1 illustrates nodes 110 and 130 as processing nodes and nodes 120 and 140 as storage resource nodes, any number and types of Fibre Channel-enabled devices can be coupled to a Fibre Channel topology within the physical limitations of that topology (e.g., the number of F_Ports on the switch fabric).

In order for two devices to communicate using a Fibre Channel, the devices must establish a channel in the network. For a switched fabric topology such as that illustrated in FIG. 1, devices connected to the switched fabric perform a fabric login procedure (FLOGI) to acquire a Fibre Channel address (FC_ID), a 24-bit address used to communicate with other devices on the switched network. Then, an initiator N_Port must log in to a target N_Port to which the initiating port will communicate. A port login procedure (PLOGI) is performed to establish a channel between the initiator and the target port. Once the channel is established, ports can exchange data. Data is exchanged between devices on the Fibre Channel using a frame-based protocol.

Fibre Channel has two types of addresses that are used to identify a Fibre Channel device or switch port. The first type of address is a globally-unique, assigned address called a worldwide name (WWN). Typically, a WWN is assigned by the manufacturer of the Fibre Channel device and is guaranteed to be globally unique. The second type of address used in Fibre Channel networks is a dynamically-assigned, hierarchical address that enables frames to be intelligently routed from one device port to another. This address is the Fibre Channel ID (FC_ID) mentioned above. In a Fibre Channel network, the FC_ID is mapped to the WWN such that initiators can use the WWN to identify a target device port, and the WWN will be translated to an FC_ID for routing through the Fibre Channel network.

The WWN to FC_ID mapping is supported by a Fibre Channel fabric using a distributed directory service. Because the FC_ID addressing assigned in a Fibre Channel fabric is dynamic, the directory service helps map a device port's static WWN to its routable FC_ID. When a device port logs in to the fabric (FLOGI), the device port is automatically registered with the directory service along with some of the device's attributes. This attribute information can then be queried by any end devices to locate a specific device or devices with specific capabilities.

The Fibre Channel standard also permits a single physical N_Port on a device to have multiple virtual addresses. Upon initialization, an HBA performs a fabric login (FLOGI) and can request as many FC_IDs from the switch fabric as that device has logical ports, which are identified by virtual world wide names (vWWN). The switch fabric can then route messages from/to these virtual logical ports in the same manner that the switch fabric performs for physical ports.

Figure 2:
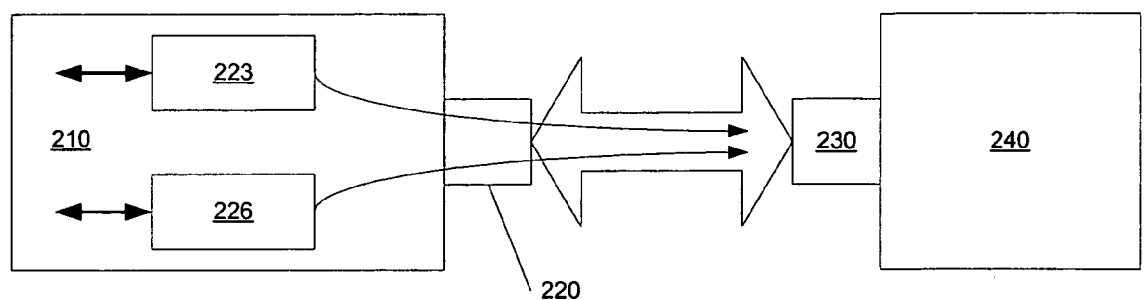
FIG. 2 is a simplified block diagram of a host bus adapter supporting a plurality of virtual N_Ports.

FIG. 2 is a simplified block diagram of a host bus adapter supporting a plurality of virtual N_Ports. Host bus adapter 210 has a physical N_Port 220 through which it communicates to an F_Port 230 that is part of switching fabric 240. HBA 210 is further configured with virtual N_Ports 223 and 226 that communicate through the physical N_Port 220 with fabric 240 via F_Port 230. Through the use of virtual N_Ports each application accessing a virtual N_Port can have specialized access to only its required storage resources and utilization of those resources can be traced to a specific application accessing a particular virtual N_Port.

One drawback of the current system of using virtual N_Ports is that the vWWNs are assigned on a node-by-node basis, rather than on a Fibre Channel network basis. That is, vWWNs are assigned at the time of the creation of a virtual N_Port on a particular node and there is no mechanism for ensuring that a vWWN assigned to a particular N_Port is unique over the entire Fibre Channel Network.

Using vWWNs to Describe a Set of Fibre Channel Devices

One environment in which embodiments of the present invention can be utilized is in the provision of application services to end-users. When an end-user uses a service, for example, accessing a database by connecting to a particular host system (or node), the application is the database. The application service is the entire collection of hardware and software components required to provide the service to the end-user. For example, such a database application service can consist of the following: one or more IP addresses, a database management system software, file systems containing data files, disk groups that have volumes on which the file system reside, and a network interface card and an IP address for network access. All of these items must be provided in order for the host system to provide the end-user the desired service. Aspects of the present invention improve the ease and flexibility of providing those items necessary to a service that are accessible through a Fibre Channel by grouping the items with a single vWWN (e.g., for the above-described database service, the disk groups having volumes on which the file systems reside).

Figure 3:
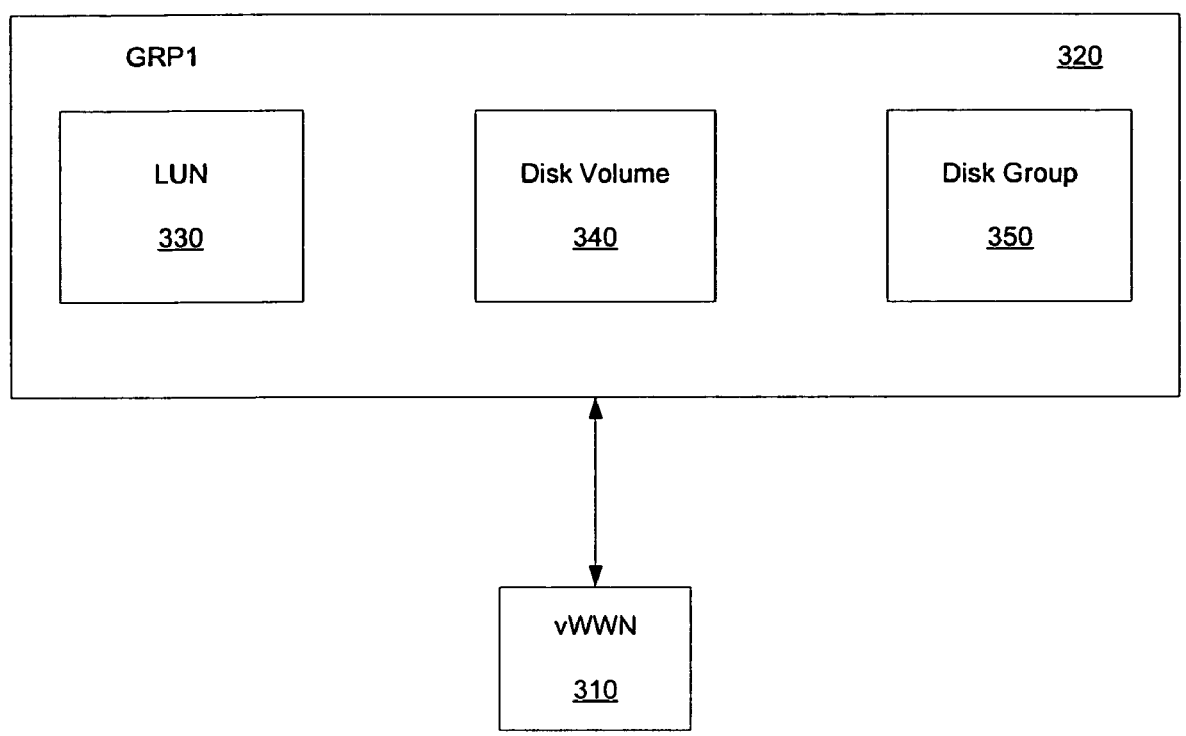
FIG. 3 is a simplified block diagram illustrating a virtual worldwide name corresponding to a group containing one or more Fibre Channel entities, usable in embodiments of the present invention.

FIG. 3 is a simplified block diagram illustrating a vWWN corresponding to a group containing one or more Fibre Channel entities, usable in embodiments of the present invention. In FIG. 3, vWWN 310 is associated with a group of Fibre Channel devices or logical representations thereof, GRP1 320. GRP1 can include one or more LUNs 330, one or more disk volumes 340 or one or more disk groups 350, in any combination appropriate for the provision of a service to an end-user. In a typical implementation, if a vWWN is associated with an application, then the vWWN will be associated with all LUNs necessary to the provision of that application. If vWWN 310 is to be associated with a disk group, then GRP1 will contain reference to all disk volumes in the disk group. If vWWN 310 is only associated with a single LUN, then GRP1 will contain only a reference to that LUN. In such a manner, only those resources necessary to the provision of a particular application in an environment will be associated with a vWWN, thereby improving flexibility of allocation of resources in a network.

Once a determination has been made for the groupings of Fibre Channel devices (either physical or logical) with one or more vWWNs, then a mechanism for maintaining and providing those vWWNs to nodes on a Fibre Channel network must be provided. Aspects of the present invention provide such a mechanism.

vWWN NameService

As described above, a fabric-based Fibre Channel network uses a directory service to map N_Ports' static worldwide names (WWN) to a dynamic Fibre Channel identification address (FC_ID). Embodiments of the present invention implement a second mapping of vWWNs with their Fibre Channel device groups, as illustrated in FIG. 3. A vWWN nameservice is provided in the Fibre Channel fabric that associates a unique vWWN with the vWWN's Fibre Channel devices.

Each vWWN can have an entry in a vWWN nameserver database, which can take the form of a table or database containing defining characteristics of each vWWN. Such characteristics can include, as appropriate, one or more LUN identifiers (e.g., 330), one or more disk volume identifiers (e.g., 340), one or more disk group identifiers (e.g., 350), or the identification of an application which is associated with Fibre Channel resources. In one embodiment of the present invention, vWWN nameservice entries can also include other SAN-related information related to the vWWN and the associated resources, including, for example, virtual SAN (VSAN) tags.

A vWWN nameserver can also provide security by restricting access to vWWNs. Such access restriction can be provided, for example, by including a list of identifiers of hosts that are permitted access to a particular vWWN in that vWWN's entry.

The vWWN nameserver can also track whether a particular vWWN has already been accessed and by which host. Such tracking can be provided, for example, by including with each vWWN entry an "in-use" flag that is set if the vWWN is in use by a host in the Fibre Channel network. The vWWN nameserver can also track which host is accessing a particular vWWN by including an "owned-by" field in each vWWN entry. Both the "in-use" field and the "owned-by" field can be set by the vWWN nameservice upon providing a vWWN to a requesting host, as will be shown in the below examples.

The vWWN nameservice is provided within the Fibre Channel fabric. The nameservice can be provided by a fabric node or another host within the Fibre Channel, provided that the fabric or host is accessible to all nodes within the Fibre Channel network that need to have access to the vWWN nameservice. Entries to the vWWN nameservice table or database can be provided either manually by editing the table or database through an appropriate utility, or through a specialized interface having access to the vWWN nameservice table or database.

Figure 4:
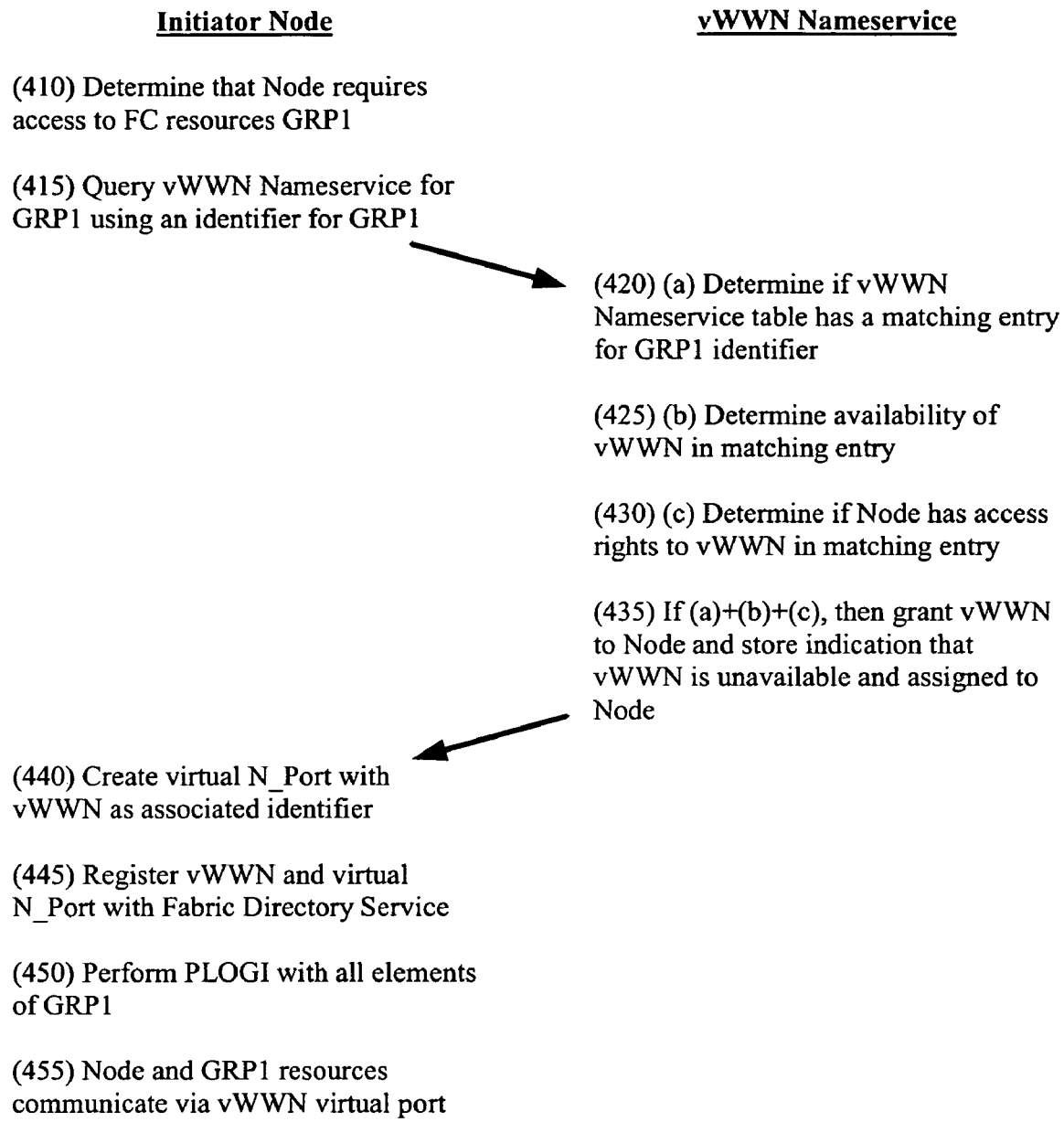
FIG. 4 is a time sequence diagram illustrating an example of steps performed by an initiator node and a vWWN nameserver in requesting, granting, and receiving a vWWN, in accord with one embodiment of the present invention.

FIG. 4 is a time sequence diagram illustrating an example of steps performed by an initiator node and a vWWN nameserver in requesting, granting, and receiving a vWWN. A user accessing an initiator node desires to use a particular service. The initiator node determines that it requires access to a set of Fibre Channel resources, GRP1, in order to execute the desired application (410). The initiator node queries the vWWN nameservice for a vWWN corresponding to GRP1 using an identifier associated with GRP1 (415). The vWWN nameservice receives the query from the initiator node and determines if the vWWN nameservice table has a matching entry for the GRP1 identifier (420). Upon finding a vWWN corresponding to the GRP1 identifier, the vWWN nameservice can then determine the availability of that corresponding vWWN to be assigned to the initiator node (425). If the vWWN is available to be assigned, the vWWN nameservice can determine if the initiator node has access rights to the vWWN (430). Upon determining that there is a corresponding vWWN, and that that vWWN is available and the initiator node has access rights, then the vWWN nameservice can grant the vWWN corresponding to GRP1 to the initiator node, and also store an indication that the vWWN is no longer available to be assigned to any other node and an indication that the vWWN is assigned to the initiator node (435). In one embodiment of the present invention, the vWWN nameservice can provide to the initiator node additional information associated with the vWWN and the associated resources, including, for example, VSAN tags.

When the initiator node receives the vWWN corresponding to GRP1 from the vWWN nameservice, the initiator node can create a virtual N_Port having the vWWN as an identifier (440). The host bus adapter for the initiator node can then register the vWWN and virtual N_Port identifier with the Fibre Channel fabric directory service (445). Subsequently, the initiator node can then perform a port login (PLOGI) with all Fibre Channel members of GRP1 through the virtual N_Port (450). Once the PLOGI has been performed, then the initiator node can communicate with all members of GRP1 via the vWWN virtual port and vice versa (455). Once the initiator node no longer needs access to the Fibre Channel resources of GRP1, the initiator node can send an indication to the vWWN nameservice to that affect. The vWWN nameservice can then clear the "in-use" flag associated with the vWWN and remove the initiator node identifier from the "owned-by" field in that entry.

Figure 5:
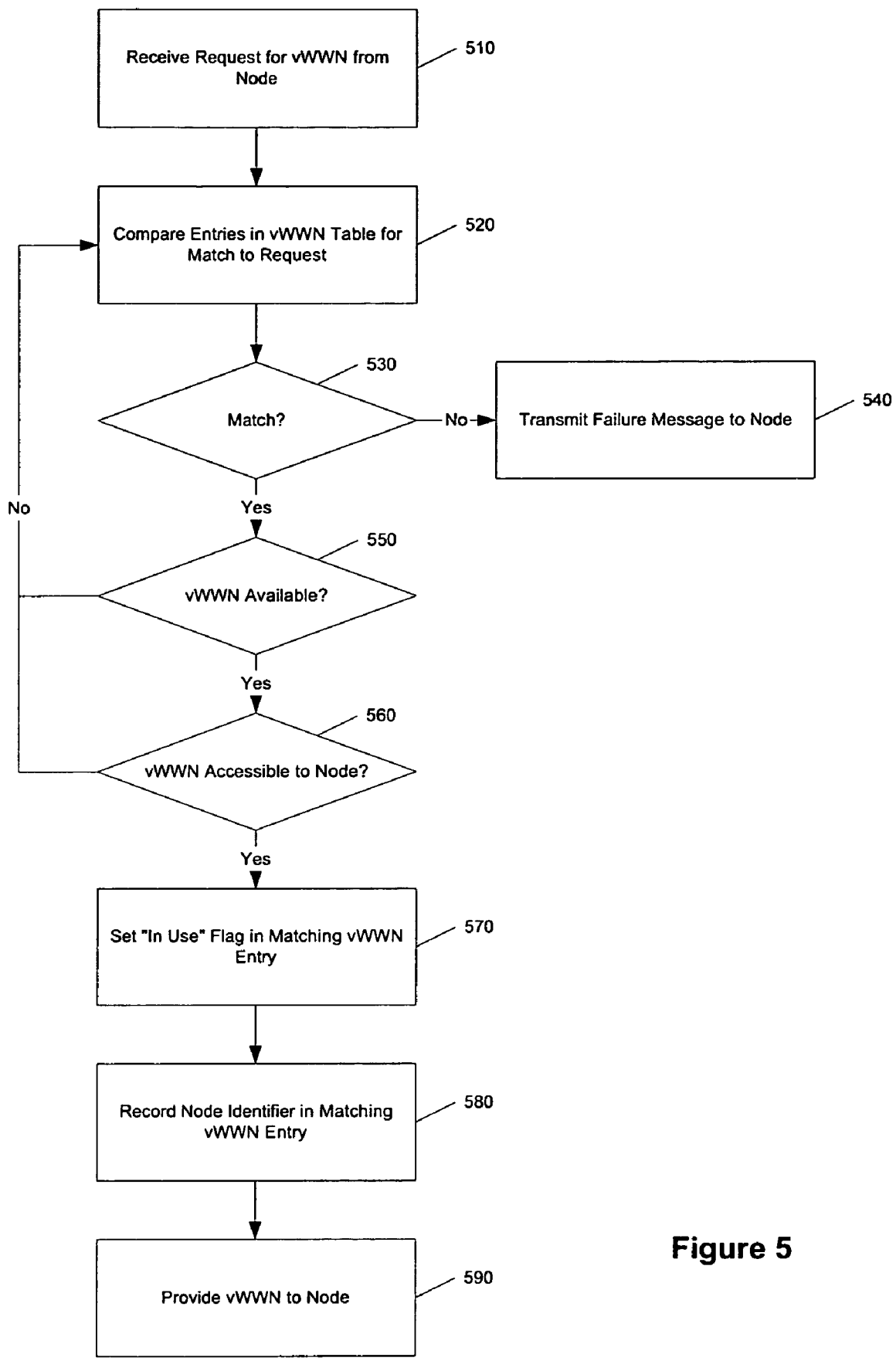
FIG. 5 is a flowchart illustrating an example of actions performed by a vWWN nameserver, in accord with one embodiment of the present invention.

FIG. 5 is a simplified flowchart illustrating actions performed by a vWWN nameserver, in accord with one embodiment of the present invention. The nameserver receives a request for a vWWN from a node on the Fibre Channel (510). The request can include an identifier corresponding to fields included in vWWN entries in the vWWN nameservice table or database. As discussed above, such an identifier can include, for example, a LUN identifier, a disk volume identifier, a disk group identifier, or an application identifier. The vWWN nameservice can then compare entries in the vWWN table or database for a match to the supplied identifier (520). Such comparison can be performed as a result of a sequential or non-sequential search algorithm on the vWWN nameservice table or database. The vWWN nameservice then determines if there is a match (530) and if no match is found then the vWWN nameservice can transmit a failure message to the requesting node (540).

If a vWWN entry containing a match to the provided identifier is found, then the vWWN nameservice can determine if the vWWN is available for assignment to the node (550). If the vWWN containing the matching field is unavailable, then the vWWN nameserver can continue comparing entries in the vWWN table for another match to the requested identifier.

If the vWWN entry containing a matching field is available, then the vWWN nameservice can determine if that vWWN is accessible by the requesting node (560). As discussed above, such a determination can be performed by comparing the identity of the requesting node to a list of nodes included in the vWWN entry that identifies those nodes allowed to access the resources associated with the vWWN. If the matching vWWN is not accessible to the requesting node, then the vWWN nameservice can continue searching for another vWWN entry containing a field matching the provided identifier from the requesting node.

If the vWWN entry containing a field matching the provided identifier is available and accessible to the requesting node, then the nameservice can set an "in-use" flag in the vWWN entry containing the matching field (570). The vWWN nameservice can also record the identifier of the requesting node in an "owned-by" field in the vWWN entry (580).

The vWWN nameservice can then provide the vWWN from the vWWN nameservice entry containing the field matching the requested identifier to the requesting node (590). As discussed above, the requesting node can then associate the provided vWWN with a virtual N_Port and use that vWWN to communicate with the resources associated with the vWWN.

In the event that either a vWWN entry containing a matching field cannot be found or that such a match is unavailable to be assigned or that an available match is not accessible to the requesting node, a failure message can be sent to the requesting node (e.g., 540). Such a failure message can include the reason for such failure. Once provided with a reason for failure to access the requested resources, a user can then contact the Fibre Channel network administrators who can then use that information to remedy the problem, if appropriate.

Through the use of a vWWN nameservice in the manner described, Fibre Channel resources can be flexibly allocated to any node having access to the Fibre Channel network. Storage network administrators are provided with a method that allows for flexible association of Fibre Channel resources with one another and to applications accessing those resources. Storage network administrators are also provided with a mechanism allowing for restricting access to groups of resources on a group-by-group basis. In addition, the described vWWN nameservice also provides for unique access to defined Fibre Channel resources.

By associating Fibre Channel resources with unique vWWNs, the need for registering and modifying access rights for various nodes on a Fibre Channel is eliminated. As described above, such access rights and groupings are determined in the vWWN nameservice table or database, and the grant of a vWWN to a particular node ensures the accessibility of the data in those resources to the accessing node.

An Example Computing and Network Environment

As shown above, the present invention can be implemented using a variety of computer systems and networks. An example of one such computing and network environment is described below with reference to FIGS. 6 and 7.

Figure 6:
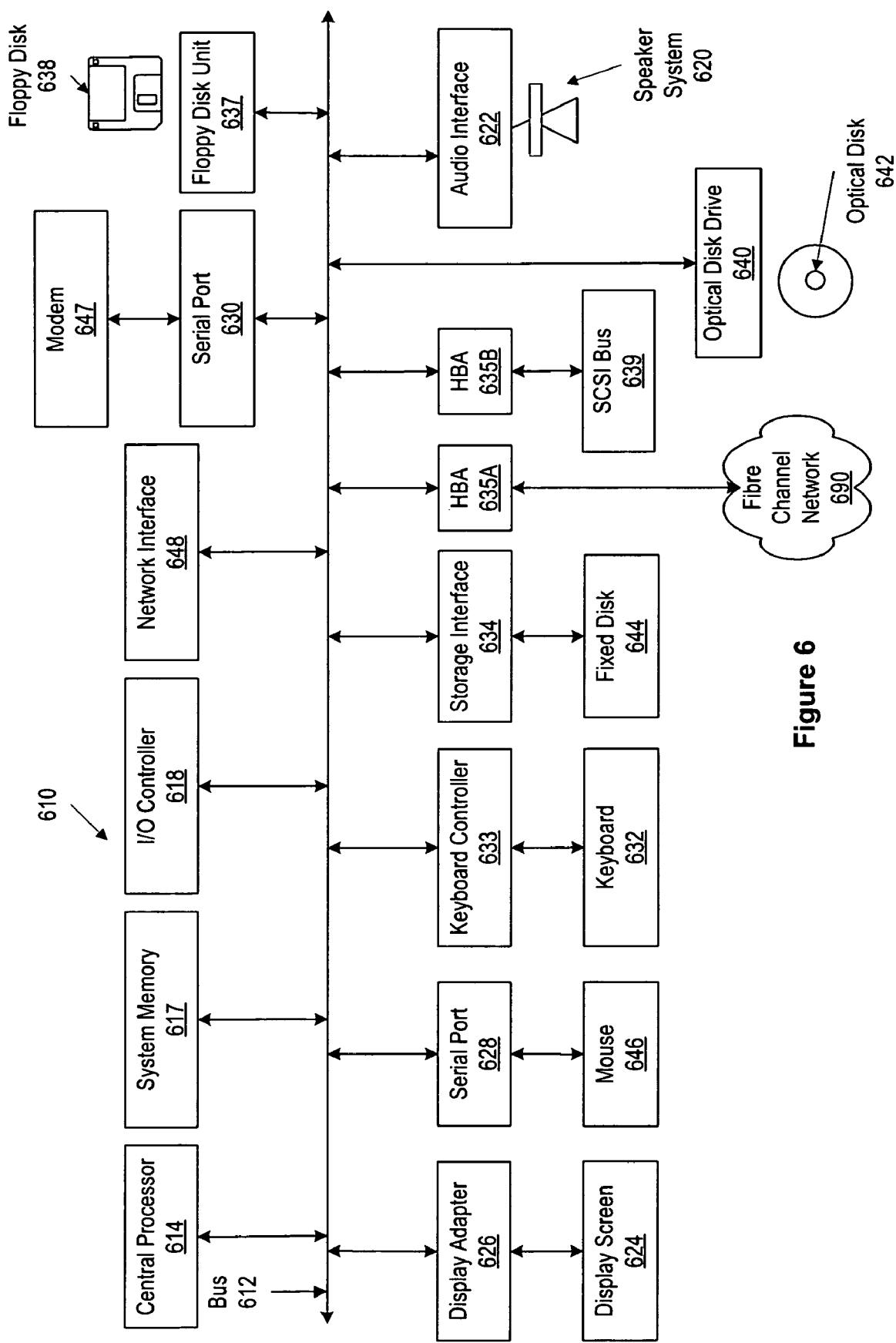
FIG. 6 depicts a block diagram of a computer system suitable for implementing embodiments of the present invention.

FIG. 6 depicts a block diagram of a computer system 610 suitable for implementing the present invention. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a computer readable medium, such as a hard disk drive (e.g., fixed disk 644), an optical drive (e.g., optical drive 640), a floppy disk unit 637, or other storage medium such as removable media in an autoloader 110. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present invention. The devices and subsystems can be interconnected in different ways from that shown in FIG. 6. The operation of a computer system such as that shown in FIG. 6 is readily known in the art and is not discussed in detail in this application. Code to implement the present invention can be stored in computer-readable storage media such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
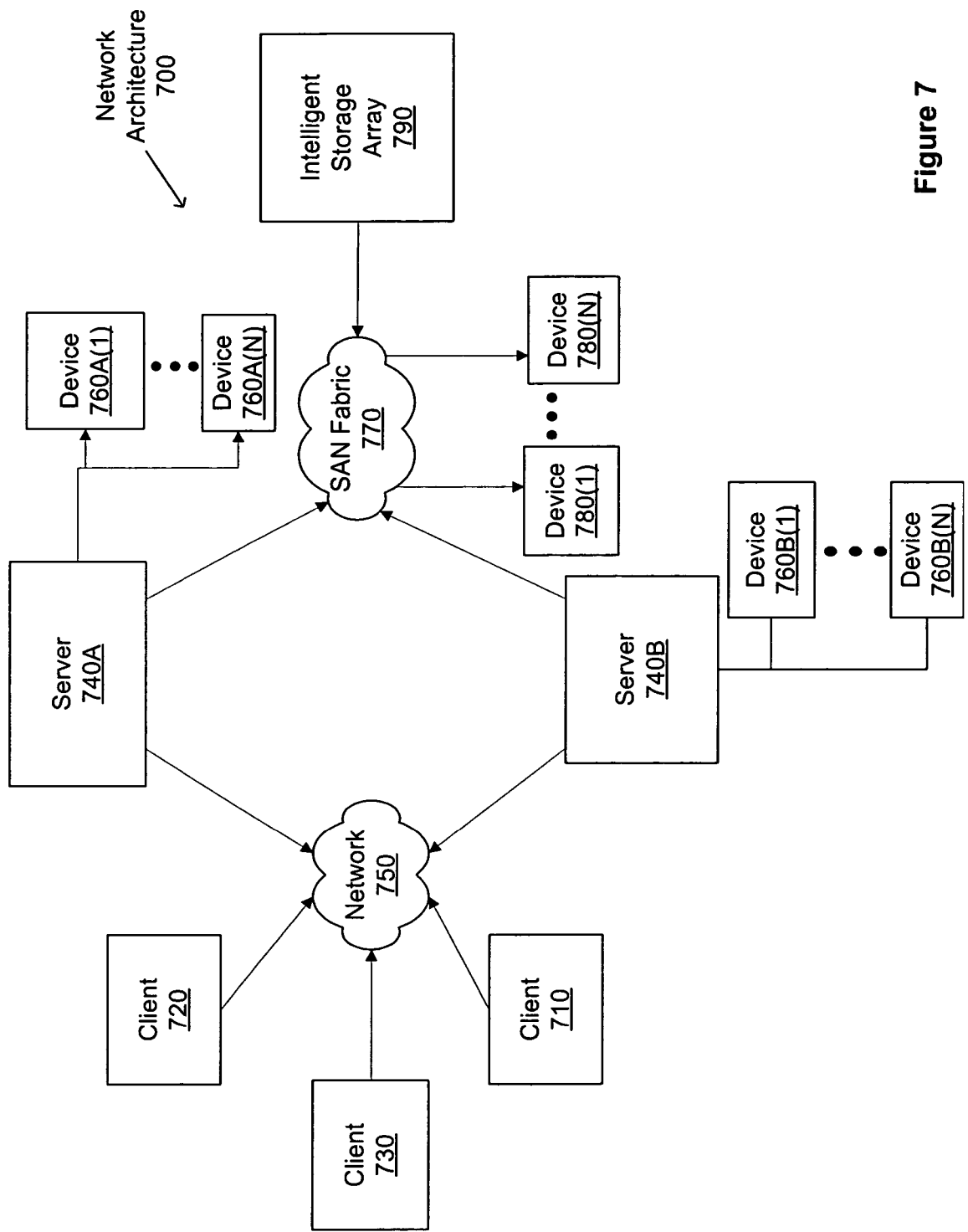
FIG. 7 is a block diagram depicting a network architecture suitable for implementing embodiments of the present invention.

FIG. 7 is a block diagram depicting a network architecture 700 in which client systems 710, 720 and 730, as well as storage servers 740A and 740B (any of which can be implemented using computer system 610), are coupled to a network 750. Storage server 740A is further depicted as having storage devices 760A(1)-(N) directly attached, and storage server 740B is depicted with storage devices 760B(1)-(N) directly attached. Storage servers 740A and 740B are also connected to a SAN fabric 770, although connection to a storage area network is not required for operation of the invention. SAN fabric 770 supports access to storage devices 780(1)-(N) by storage servers 740A and 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720 and 730 to network 750. Client systems 710, 720 and 730 are able to access information on storage server 740A or 740B using, for example, a web browser or other client software (not shown). Such a client allows client systems 710, 720 and 730 to access data hosted by storage server 740A or 740B or one of storage devices 760A(1)-(N), 760B(1) (N), 780(1)-(N) or intelligent storage array 790. FIG. 7 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 610). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   providing, using a processor, a virtual worldwide name (vWWN) nameservice for responding with a unique vWWN to a request for a vWWN from an initiator node in a Fibre Channel storage area network (SAN), wherein a first mapping maps a static worldwide name (WWN) to a dynamic Fibre Channel identification address (FC_ID) of the initiator node using a directory service, the vWWN nameservice maintains a vWWN table comprising a second mapping between table entries of a plurality of application services, including both hardware and software components of a plurality of Fibre Channel devices required to provide at least one of the plurality of application services to the initiator node, and an associated vWWN for each application service, the request is received by a Fibre Channel port coupled to the processor, the request comprises an identifier associated with a characteristic of resources in the SAN, the characteristic comprising one or more of a disk group identifier, a disk volume identifier, and an application identifier, and, the vWWN nameservice responds to the request received from the initiator node by determining if the identifier of the request matches contents of a field in one or more of the entries in the vWWN table comprising the second mapping, and providing the initiator node with the vWWN associated with a determined matching entry.

2. The method of claim 1, wherein said determining comprises:

comparing the identifier with information in each of the one or more entries, wherein the information in each of the one or more entries comprises one or more of the characteristics associated with the vWWN associated with the entry.

3. The method of claim 1, further comprising: for each matching entry, determining if the vWWN is available to be assigned to the initiator node using availability information stored in the matching entry, and performing said providing the vWWN only if the vWWN is available to be assigned.

4. The method of claim 3 wherein the availability information comprises a logical flag set if access rights to vWWN are currently assigned.

5. The method of claim 1, further comprising: for each matching entry, determining if the initiator node is permitted access to the vWWN using access information stored in the matching entry, and performing said providing the vWWN only if the initiator node is permitted access to the vWWN.

6. The method of claim 5 wherein the access information comprises a list of one or more nodes allowed to access the resources associated with the vWWN.

7. The method of claim 1, further comprising: storing availability information in the matching entry upon performing said providing.

8. The method of claim 7 wherein the availability information comprises setting a logical flag indicating that the vWWN is assigned.

9. The method of claim 7 wherein the availability information comprises an identifier of the initiator node.

10. An apparatus comprising:

a Fibre Channel network port, wherein the Fibre Channel network port is configured to receive and transmit a datastream on a Fibre Channel storage area network (SAN); and a processor coupled to the Fibre Channel network port and configured to provide a virtual worldwide name (vWWN) nameservice for responding with a unique vWWN to a request for a vWWN from an initiator node in the Fibre Channel SAN, wherein a first mapping maps a static worldwide name (WWN) to a dynamic Fibre Channel identification address (FC_ID) of the initiator node using a directory service, the vWWN nameservice maintains a vWWN table comprising a second mapping between table entries of a plurality of application services, including both hardware and software components of a plurality of Fibre Channel of devices required to provide at least one of the plurality of application services to the initiator node, and an associated vWWN for each application service, the request comprises an identifier associated with a characteristic of resources in the SAN, the characteristic comprising one or more of a disk group identifier, a disk volume identifier, and an application identifier, and, the vWWN nameservice responds to the request received from the initiator node by determining if the identifier of the request matches contents of a field in one or more of the entries in the vWWN table comprising the second mapping, and providing the initiator node with the vWWN associated with a determined matching entry.

11. The apparatus of claim 10, wherein further comprising:

the processor further configured to compare the identifier with information in the fields associated with each of the one or more entries wherein the information in the fields associated with each of the one or more entries comprises one or more of the characteristics associated with the vWWN associated with the entry.

12. The apparatus of claim 10, further comprising: for each matching entry, the processor further configured to determine if the vWWN is available to be assigned to the initiator node using availability information stored in the matching entry, and perform said providing the vWWN only if the vWWN is available to be assigned.

13. The apparatus of claim 10, further comprising: for each matching entry, the processor further configured to determining if the initiator node is permitted access to the vWWN using access information stored in the matching entry, and performing said providing the vWWN only if the initiator node is permitted access to the vWWN.

14. A non-transitory computer-readable storage medium storing instructions executable by a processor, the instructions comprising:

a first set of instructions configured to provide a virtual worldwide name (vWWN) nameservice for responding with a unique vWWN to a request for a vWWN from an initiator node in a Fibre Channel storage area network (SAN), wherein a first mapping maps a static worldwide name (WWN) to a dynamic Fibre Channel identification address (FC_ID) of the initiator node using a directory service, and the vWWN nameservice maintains a vWWN table comprising a second mapping between table entries of a plurality of application services, including both hardware and software components of a plurality of Fibre Channel devices required to provide at least one of the plurality of application services to the initiator node, and an associated vWWN for each application service, the request comprises an identifier associated with a characteristic of resources in the SAN, the characteristic comprising one or more of a disk group identifier, a disk volume identifier, and an application identifier, and, the vWWN nameservice responds to the request received from the initiator node by determining if the identifier of the request matches contents of a field in one or more of the entries in the vWWN table comprising the second mapping, and providing the initiator node with the vWWN associated with a determined matching entry.

15. A system comprising:

a processor, means for receiving and transmitting a datastream on a Fibre Channel storage area network (SAN); and means for causing said processor to provide a virtual worldwide name (vWWN) nameservice by responding with a unique vWWN to a request for a vWWN from an initiator node in the SAN, wherein the request is received by the means for receiving, wherein a first mapping maps a static worldwide name (WWN) to a dynamic Fibre Channel identification address (FC_ID) of the initiator node using a directory service, and the vWWN nameservice maintains a vWWN table comprising a second mapping between table entries of a plurality of application services, including both hardware and software components of a plurality of Fibre Channel of devices required to provide at least one of the plurality of application services to the initiator node, and an associated vWWN for each application service, the request comprises an identifier associated with a characteristic of resources in the SAN, the characteristic comprising one or more of a disk group identifier, a disk volume identifier, and an application identifier, and, the vWWN nameservice responds to the request received from the initiator node by determining if the identifier of the request matches contents of a field in one or more of the entries in the vWWN table comprising the second mapping, and providing the initiator node with the vWWN associated with a determined matching entry.

\* \* \* \* \*